United States Patent
Haberbusch et al.

(10) Patent No.: US 8,807,382 B1
(45) Date of Patent: Aug. 19, 2014

(54) STORAGE SYSTEM HAVING FLEXIBLE VACUUM JACKET

(75) Inventors: Mark S. Haberbusch, Amherst, OH (US); Brad Stoops, Bay Village, OH (US); Chinh T. Nguyen, Port Clinton, OH (US); Robert J. Stochl, Middleburg Heights, OH (US); Martin E. Roth, Norwalk, OH (US)

(73) Assignee: Sierra Lobo, Inc., Fremont, OH (US)

( * ) Notice: Subject to any disclaimer, the term of this patent is extended or adjusted under 35 U.S.C. 154(b) by 819 days.

(21) Appl. No.: 12/752,543

(22) Filed: Apr. 1, 2010

Related U.S. Application Data

(60) Provisional application No. 61/211,618, filed on Apr. 1, 2009.

(51) Int. Cl.
*F17C 1/12* (2006.01)

(52) U.S. Cl.
USPC ............ 220/560.12; 220/560.04; 220/592.27; 285/205; 285/123.2; 285/148.28

(58) Field of Classification Search
USPC ............... 137/613, 614; 220/560.04, 560.08, 220/560.12, 592.26, 592.27, 560.15, 220/560.14, 560.13, 661, 601; 285/120.1, 285/123.1, 123.46, 123.2, 139.1, 139.2, 285/139.3, 143.1, 148.28, 205, 206, 215, 285/904; 62/50.7
See application file for complete search history.

(56) References Cited

U.S. PATENT DOCUMENTS

| | | | |
|---|---|---|---|
| 3,024,941 A | | 3/1962 | Vandenberg |
| 3,298,187 A | * | 1/1967 | Short .............................. 62/48.1 |
| 3,428,103 A | * | 2/1969 | Walsh .............................. 383/97 |
| 3,983,913 A | * | 10/1976 | Bower ............................ 141/95 |
| 3,988,029 A | * | 10/1976 | Gibson ............................ 285/47 |
| 4,117,947 A | * | 10/1978 | Androulakis ............ 220/560.08 |
| 4,168,014 A | * | 9/1979 | Schultz et al. ............. 220/560.1 |
| 4,269,323 A | * | 5/1981 | Ito et al. .................. 220/560.12 |
| 4,366,917 A | * | 1/1983 | Kotcharian ............. 220/560.06 |
| 4,557,444 A | | 12/1985 | Jackson et al. |
| 4,581,285 A | | 4/1986 | Mahefkey, Jr. |
| 4,625,753 A | * | 12/1986 | Gustafson ..................... 137/202 |

(Continued)

FOREIGN PATENT DOCUMENTS

WO    WO 9325843 A1 * 12/1993 .............. F17C 3/08

OTHER PUBLICATIONS

"Cryotherm 243 Cryogenic Insulation". Lydall Corporation. Oct. 19, 2004.*

(Continued)

*Primary Examiner* — Fenn Mathew
*Assistant Examiner* — Chetan Chandra
(74) *Attorney, Agent, or Firm* — Pearne & Gordon LLP

(57) ABSTRACT

A storage system useful for storing cryogenic liquids is disclosed. The storage system includes a storage vessel, insulation surrounding the storage vessel and a flexible vacuum jacket enclosing them both. The flexible vacuum jacket can be made from a flexible plastic film such as polyimide. Polyimide is preferred due to its ability to remain flexible at cryogenic temperatures. The inner volume of the flexible vacuum jacket is placed under vacuum such that the insulation is maintained under vacuum. The flexible vacuum jacket can collapse against and conform to the insulation when it is evacuated, saving substantially on volume. A fitting for combining multiple passageways is also disclosed, so that multiple passageways can proceed through the vacuum jacket through a single penetration.

23 Claims, 4 Drawing Sheets

(56) References Cited

U.S. PATENT DOCUMENTS

| | | | |
|---|---|---|---|
| 4,726,974 A * | 2/1988 | Nowobilski et al. | 428/69 |
| 4,774,118 A | 9/1988 | Davis et al. | |
| 4,830,937 A * | 5/1989 | Clerici | 429/120 |
| 4,854,128 A * | 8/1989 | Zeamer | 62/50.1 |
| 5,009,073 A * | 4/1991 | Missimer et al. | 62/51.1 |
| 5,160,174 A * | 11/1992 | Thompson | 285/32 |
| 5,290,071 A * | 3/1994 | Rider et al. | 285/39 |
| 5,419,139 A * | 5/1995 | Blum et al. | 62/45.1 |
| 5,900,299 A * | 5/1999 | Wynne | 428/69 |
| 5,971,444 A * | 10/1999 | Hawkins | 285/206 |
| 6,106,449 A * | 8/2000 | Wynne | 493/101 |
| 6,183,021 B1 * | 2/2001 | Walsh et al. | 285/123.15 |
| 6,521,077 B1 * | 2/2003 | McGivern et al. | 156/304.1 |
| 6,634,519 B2 * | 10/2003 | Pelloux-Gervais et al. | 220/560.1 |
| 6,708,502 B1 * | 3/2004 | Aceves et al. | 62/45.1 |
| 7,147,124 B2 * | 12/2006 | Minta et al. | 220/560.07 |
| 7,494,023 B2 * | 2/2009 | Rohwer | 220/560.12 |
| 7,562,670 B1 | 7/2009 | Jones et al. | |
| 7,611,761 B2 * | 11/2009 | Yuasa et al. | 428/34.1 |
| 7,867,589 B2 * | 1/2011 | DeLay | 428/36.91 |
| 7,909,366 B1 * | 3/2011 | Hall | 285/205 |
| RE42,467 E * | 6/2011 | Boffito et al. | 62/45.1 |
| 8,100,284 B2 * | 1/2012 | Schlag et al. | 220/560.12 |
| 2002/0083717 A1 | 7/2002 | Mullens et al. | |
| 2002/0166326 A1 | 11/2002 | Giesy et al. | |
| 2003/0029877 A1 * | 2/2003 | Mathur et al. | 220/592.27 |
| 2004/0058119 A1 * | 3/2004 | Wynne | 428/69 |
| 2005/0200493 A1 | 9/2005 | Marishak, Jr. | |
| 2006/0196876 A1 * | 9/2006 | Rohwer | 220/560.12 |
| 2008/0006743 A1 | 1/2008 | Miller et al. | |
| 2008/0209915 A1 * | 9/2008 | Harper et al. | 62/45.1 |
| 2008/0307800 A1 * | 12/2008 | Levin et al. | 62/50.7 |
| 2009/0199574 A1 * | 8/2009 | Hirose et al. | 62/46.1 |
| 2009/0321452 A1 | 12/2009 | Wiertz | |
| 2010/0012864 A1 | 1/2010 | Smith | |
| 2010/0162730 A1 * | 7/2010 | Levin et al. | 62/50.7 |
| 2010/0187237 A1 * | 7/2010 | Brooks et al. | 220/560.04 |
| 2012/0279971 A1 * | 11/2012 | Brooks et al. | 220/560.12 |

OTHER PUBLICATIONS

"Accommodate—definition.pdf" Date printed: Nov. 21, 2013 www.macmillandictionary.com.*
Dupont, "Summary of Properties for Kapton® Polymide Films," 2006, 26 pages.
Frank, Alan M., "External Insulation Systems for Cryogenic Storage Systems. vol. 1: Optical Properties of Kapton and Report of Process Variable Study," Final Report, Aug. 30, 1974, Colspan Inc., Boulder, CO, 55 pgs.
Development of Advanced Material Composites for Use as Internal Insulation for LH2 Tanks (Gas Layer Concept), Final Report, Jul. 1972, Martin Marietta Corp., 131pgs.

* cited by examiner

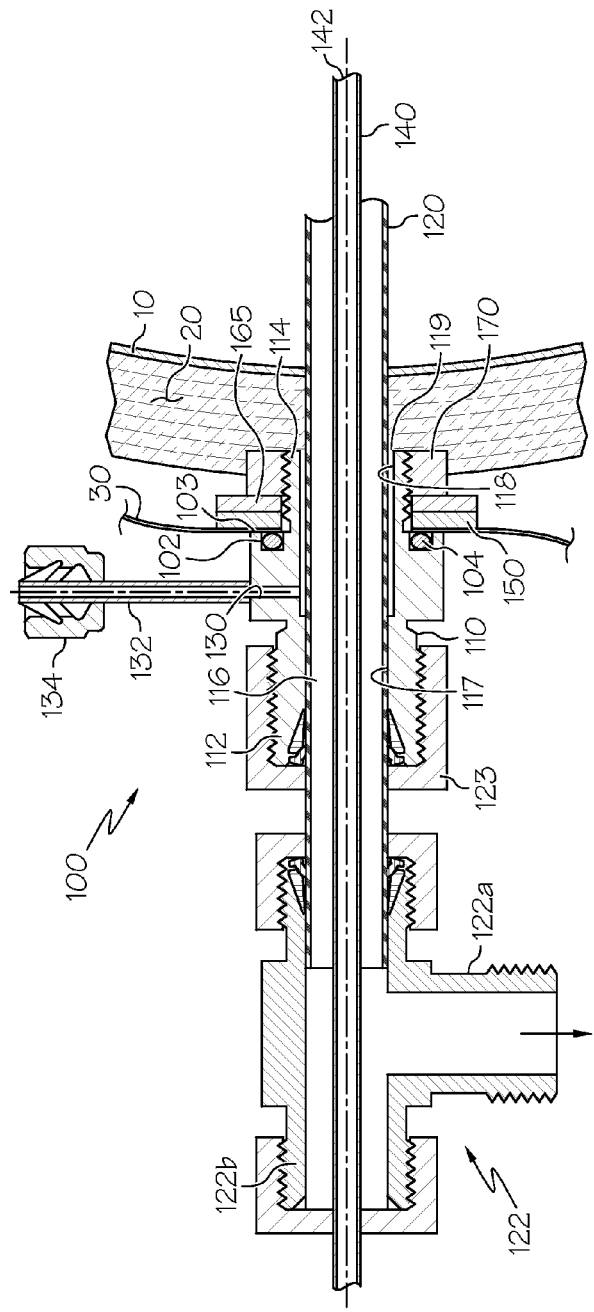
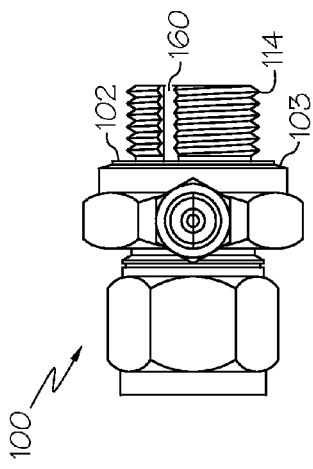
FIG. 3A
FIG. 3B

STORAGE SYSTEM HAVING FLEXIBLE VACUUM JACKET

CROSS-REFERENCE TO RELATED APPLICATIONS

This application claims the benefit of U.S. provisional patent application Ser. No. 61/211,618 filed Apr. 1, 2009, the contents of which are incorporated herein by reference in their entirety.

STATEMENT OF GOVERNMENT-SPONSORED RESEARCH

This invention was made at least in part with government support under contract No. N00173-03-C-2025 awarded by the Naval Research Laboratory. The government has certain rights in this invention.

BACKGROUND OF THE INVENTION

Many materials that are normally encountered and exist in the gas phase under standard conditions (e.g. 273-298K, 1 atm) can be liquefied by cooling them to very low temperatures, typically below 200K. These materials include, but are not limited to, the noble gases including helium, neon, argon and krypton, diatomic gases such as hydrogen, nitrogen and oxygen, and hydrocarbon gases such as methane (natural gas), ethane and propane. Of course, this is not an exhaustive list. The liquid forms of these materials are referred to as cryogenic liquids because they must be maintained at cryogenic temperatures, typically below 200K (although certain materials such as propane have somewhat higher boiling points), to keep them in the liquid phase. Even when these materials will be used in the gas phase, it is still advantageous to store and transport them in the liquid phase because a substantially greater mass of material can be stored in a given volume due to the significantly greater density of the cryogenic liquid compared to the gas phase.

Cooling and maintaining these materials at cryogenic temperatures is energy intensive. That is, it requires a great deal of energy to refrigerate cryogenic materials due to the abundant sources of thermal energy that typically surround cryogenic-storage vessels. On Earth, the ambient environment alone, consisting of air typically ranging in temperature from 273K to 300K, provides an infinite source of thermal energy to raise the temperature of a cryogenic liquid inside a storage vessel. Other devices and machines often installed in proximity to cryogenic-storage vessels, e.g. motors and electrical circuits, provide additional sources of thermal energy. The sun provides yet a third source of thermal energy. Thermal energy from all these sources tends to enter a cryogenic storage vessel to raise the temperature of the stored cryogenic material, driven by the temperature gradient between the energy source and the liquid cryogen.

To counteract the natural tendency of thermal energy to enter the cryogenic-storage vessel from surrounding sources, often termed "heat leak," such storage vessels are typically encapsulated by insulation. The insulation is a material or combination of materials that exhibits a higher resistance to heat transfer than the storage-vessel wall alone. Thus the insulation slows the rate of heat leak into the storage vessel, thus reducing the cooling duty required to maintain the vessel and its contents at the desired cryogenic temperature. Alternatively, in the absence of an active cooling system the insulation extends the length of time the cryogen may be stored in the liquid state, or at least minimizes the rate of venting of vaporized cryogenic material to avoid overpressure that may result in rupture of the storage vessel.

In addition to installing insulation material around the storage vessel, it is also common to draw a vacuum around the storage vessel and insulation. This removes a significant thermal-transfer medium, air, from the immediate vicinity surrounding the storage vessel. Air is an effective medium for both conductive and convective heat transfer. By drawing a vacuum around the storage vessel and its insulation, these modes of heat transfer into the storage vessel can be minimized, leaving radiation as the principle mode of heat transfer left to combat.

Conventionally, a cryogenic-storage vessel is disposed within the volume of a second, larger storage vessel, which serves as vacuum vessel. A vacuum is drawn on the interior volume of the vacuum vessel, which places the space surrounding the cryogenic-storage vessel under vacuum. The vacuum vessel is conventionally made of steel, such as stainless steel. Such vacuum vessels are bulky and heavy.

For cryogenic materials such as hydrogen and oxygen that are used as propellants in aircraft and other launch vehicles, it is desirable that the entire cryogenic storage system be as lightweight as possible. This permits the system to have the smallest impact on the aerodynamic characteristics and flight performance of the vehicle. At the same time, these systems are in proximity to a very strong heat source: a jet- or rocket-propulsion system. Thus, in addition to being lightweight it is desirable that an airborne cryogenic-storage system inhibit the transmission of thermal energy into the storage vessel as much as possible.

SUMMARY OF THE INVENTION

A storage system is provided, which includes a storage vessel, thermal insulation disposed outside the storage vessel, and a flexible vacuum jacket substantially enclosing the storage vessel and the thermal insulation.

A fitting is also provided. The fitting has a fitting body having a bore extending therethrough and a male end that extends axially from a seating face of the fitting body. The male end has an axial groove therein. An O-ring gasket is fitted over the male end, a washer having a radial projection is also fitted over the male end such that the radial projection is received in the axial groove thereby inhibiting rotation of the washer over the male end. The bore through the fitting body has an inner diameter that extends at least through the male end. A vent tube extends into the fitting body through the male end. The vent tube has an outer diameter smaller than the inner diameter of the bore such that the vent tube and the inner diameter of the bore define an annular vacuum space therebetween. A vacuum port is provided through the fitting body in fluid communication with the annular vacuum space. A fill tube extends through the vent tube within the fitting body.

BRIEF DESCRIPTION OF DRAWINGS

FIG. 3a shows a close-up side view, in section, of a fitting assembly for accommodating fluid-, vent- and vacuum passageways therein as hereafter described. FIG. 3b is a side-view projection of the fitting assembly shown in FIG. 3a.

DETAILED DESCRIPTION OF PREFERRED EMBODIMENTS

As used herein, when a range such as 5-25 (or 5 to 25) is given, this means preferably at least 5 and, separately and independently, preferably not more than 25.

Figure 1:
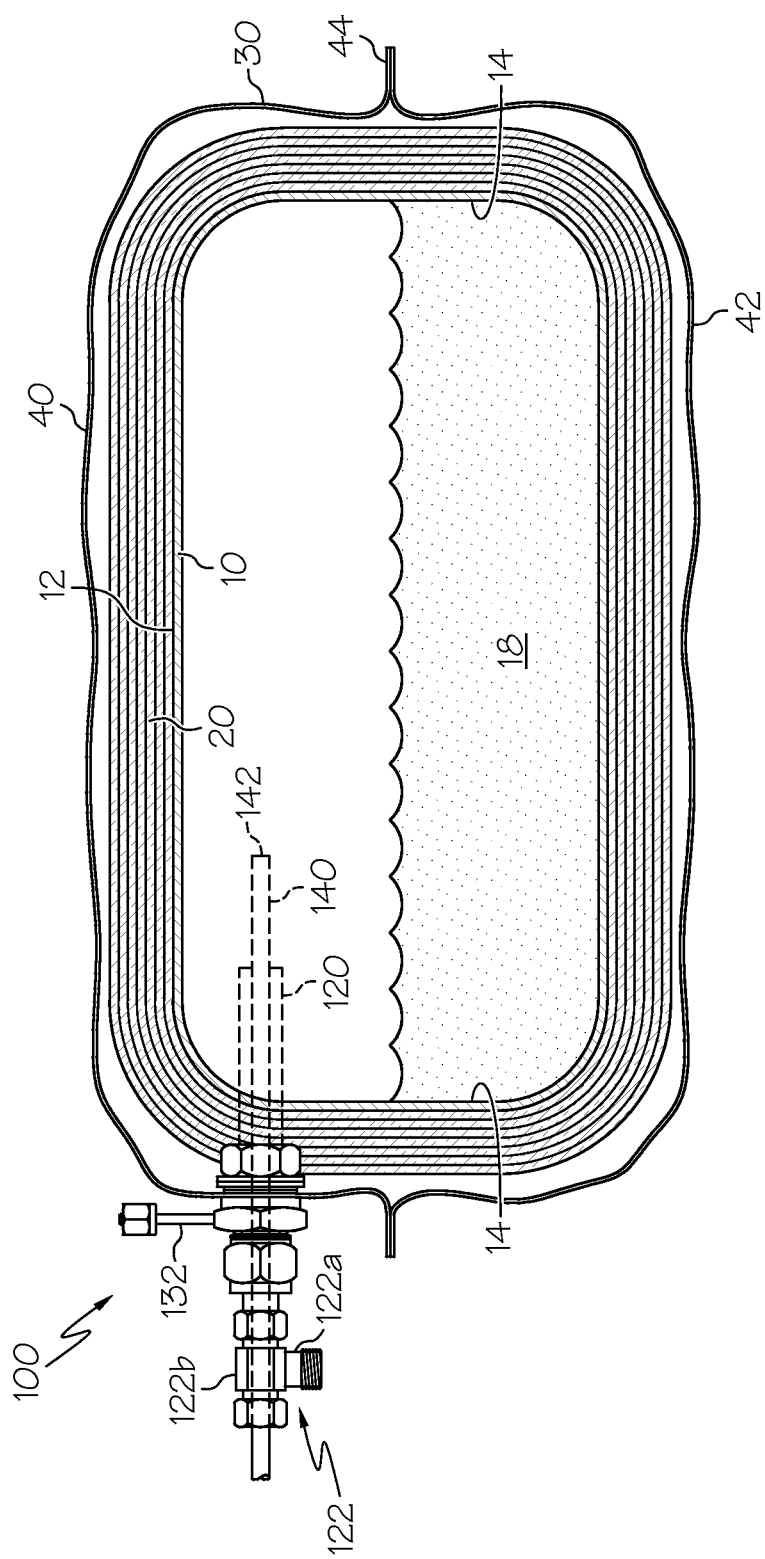
FIG. 1 is a side cross-sectional view of a storage system as herein described.

Referring first to FIG. 1, an embodiment of a storage system having a flexible, collapsible vacuum jacket is illustrated. In particular, a storage vessel 10 is illustrated, which is surrounded by insulation 20. The vessel 10 and surrounding insulation 20 are both enclosed within a flexible vacuum jacket 30. In preferred embodiments, the storage vessel 10 is a cryogenic-storage vessel, which means that it is used or intended to store cryogenic liquids 18.

The storage vessel 10 itself can be made in a conventional manner from conventional materials. For example, it can be made of stainless steel or aluminum, or any other material capable to withstand the in-service conditions, e.g. cryogenic temperatures, it will encounter during use. Preferably, the storage vessel 10 is made of a material capable to withstand repeated cycles of cooling to cryogenic temperatures below 200K, and even as low as or below 20K (for hydrogen) or 4K (for helium), and heating back to ambient temperature, e.g. 298K, without sustaining significant damage that will prevent its continued use to store liquid cryogens. In one embodiment, the storage vessel 10 is made of stainless steel, such as 316 stainless steel, and has a nominal cylindrical-wall thickness in the range of 0.025-0.05 inch, preferably 0.03-0.04 inch, most preferably of or about 0.035 inch. The cylindrical wall 12 can be made, e.g., via a conventional spinning method as known in the art. The end walls 14 are dimensioned to match the diameter of the cylindrical wall 12, and are welded thereto at opposite ends thereof in a conventional fashion to produce the finished vessel 10. Depending on the application, it may be desirable that the end walls 14 have an increased or variable thickness compared to the cylindrical wall 12 to meet stress requirements. Although the storage vessel 10 commonly will be made of metal, its materials of construction are limited only by the requirements of the in-service application, for example, stress and temperature requirements. The storage vessel 10 may accordingly be constructed from other materials and according to other methods that will accommodate and be compatible with the in-service conditions of a particular application. For example, other metals or metal alloys may be used. In a further alternative, plastics or composite materials may be used.

The insulation 20 is shown schematically in FIG. 1, and for cryogenic applications typically includes a layered structure such as conventional multi-layer insulation ("MLI") as known in the art. MLI typically is composed of a series of very thin (e.g. 20 μm, 10 μm or less, thick) layers of plastic film, such as polyimide (Kapton®) or biaxially-oriented polyethylene terepthalate or boPET (Mylar®) coated on at least one surface (but can be both surfaces) with a thermally-reflective coating, usually a metallic coating such as silver, aluminum, platinum, gold or other reflective metals. Preferably, the metallic coating has a thickness of at least 300 angstroms. Alternatively, the layers can be simply very thin sheets (same or comparable thicknesses as above) of metal foil, for example foils of the same or other metals mentioned above. Preferably, the thin layers of metalized (or other thermally-reflective) film/foil are spaced from one another via intermediate spacer layers composed of netting having very low thermal conductivity, e.g. on the order of 0.1-0.3 W/m-K or lower, to minimize thermal contact between the adjacent thermally-reflective layers. A polyethylene terepthalate netting is commonly used for this purpose, which is sold under the tradename Dacron®. Generally, the conventional MLI insulation described in this paragraph provides only modest insulation against heat transfer through convection and conduction. Therefore, MLI insulation typically is used under vacuum, where convection and conduction heat transfer are minimized or relatively insignificant, and radiation dominates as the principal mode of heat transfer.

The conventional MLI insulation described in the preceding paragraph provides adequate or better insulation performance at very high vacuum levels, such as pressures of $10^{-4}$ torr or below. In practical applications, pressures substantially below $10^{-4}$ torr are often employed to achieve good performance from MLI insulation. Above these pressures, convective and conductive heat-transfer modes become more significant and MLI is less effective. In a preferred embodiment, the netting spacer layers of conventional MLI insulation are replaced with aerogel layers, preferably made from silica aerogel. Aerogels have lower thermal conductivity than the conventional Dacron® netting, for example on the order of 0.01 W/m-K, which is approximately a full order of magnitude lower than Dacron®. The reduced thermal conductivity of silica aerogel even further thermally isolates the reflective layers when aerogel layers are used intermediate the thermally-reflective layers. In addition, due to their extremely low thermal conductivity, the aerogel layers themselves introduce a significant barrier to conductive and convective heat transfer that is not present with conventional Dacron netting, which makes the whole insulation 20 composite less dependent on high vacuum to produce adequate or good insulation performance. Using aerogel layers intermediate the reflective layers, the reflective layers provide insulation against radiation heat transfer as before, and the aerogel layers insulate against convective and conductive heat transfer.

The silica aerogel layers used in this embodiment for composite insulation 20 can be, for example, Cryogel Z, available from Aspen Aerogels, Inc. The aerogel layers preferably are supplied in sheets having a thickness of nominally 0.1 to 10 mm, preferably 0.1 to 2 mm, preferably 0.2 to 1 mm, most preferably 0.2 to 0.5 mm. To assemble the composite insulation 20, layers of the metalized plastic film or metal-foil reflective layers are stacked alternately with layers of the aerogel until the desired total number of layers of each have been combined to produce the insulation 20. Preferably, at least 10, 20, 30 or 40 layers each of alternating reflective and aerogel layers are used. Once the desired composite insulation 20 has been prepared, having the desired number of layers, it is applied over the external surface of the storage vessel 10, preferably so that it wraps around and substantially covers the entire external surface, including the cylindrical wall 12 and both end walls 14. When wrapping the insulation over the storage vessel 10, care should be taken to avoid as much as possible abrading the aerogel layers, which may powder and disintegrate if they experience excessive mechanical stresses. The insulation may be cut into desired shapes prior to applying or wrapping to the vessel 10, depending on the vessel configuration and geometry. The insulation 20 can be glued or fin-mounted on the surface of the storage vessel 10, or applied via other conventional means.

Despite the presence of the aerogel layers in the insulation 20, it is still desirable to maintain the space around a cryogenic-storage vessel 10 and its insulation 20 under vacuum to minimize heat transfer as much as possible. But a composite metalized-plastic/aerogel insulation 20 as here described should exhibit thermal-insulation performance that is less sensitive to fluctuations in the vacuum pressure, or to the degree of vacuum that is available, than conventional MLI insulation, which should contribute to improved thermal-insulation performance. In addition, unlike the Dacron® netting used in conventional spacer layers, the silica-aerogel layers possess an internal porosity or void space that is largely sealed from the outside environment, meaning that these layers are less sensitive to the presence of air (i.e. to pressure surrounding the insulation 20) to support their thermal performance.

Returning to FIG. 1, the storage vessel 10 and insulation 20 are substantially enclosed within a flexible vacuum jacket 30 as mentioned above. In FIG. 1, the vacuum jacket 30 is illustrated an exaggerated distance from the insulation 20 for clarity. In actual use, however, the vacuum jacket 30 preferably will be substantially collapsed against and follow the contour of the outer surface of the insulation 20 as will become apparent from the following description.

The vacuum jacket 30 is made of a flexible plastic layer or film that is collapsible against the outer surface of the insulation 20 upon drawing a vacuum therein. Preferably, the vacuum jacket 30 material can withstand repeated cycles of cooling to cryogenic temperatures and reheating to ambient temperatures, e.g. repeated temperature swings of 298K to less than 200K, preferably less than 150K, 100K, 50K, 10K or even 5K, and back up to 298K, without cracking and while retaining its strength and shape. Ideally, the vacuum jacket 30 is made of a material that retains a measure of flexibility even at or below the cryogenic temperatures mentioned in the previous sentence. This is not a requirement for the vacuum jacket 30 because under normal operation the vacuum jacket 30 is not expected to be subjected to cryogenic temperatures (except perhaps where piping carrying cryogenic material into/out from the vessel 10 penetrates the jacket 30) due to the insulating performance of insulation 20. However, it is nevertheless desirable for the vacuum jacket 30 to be flexible at cryogenic temperatures to avoid brittleness and potential failure thereof in the event of an isolated failure of the insulation at one or more locations, which may expose the vacuum jacket 30 to cryogenic temperatures at those locations, as well as at locations where cryogenic piping or instrumentation may penetrate the jacket 30. Preferably the vacuum jacket 30 material remains flexible at cryogenic temperatures less than 200K, preferably less than 150K, preferably less than 100K, 80K, 50K, 30K and even 10K or 5K.

In preferred embodiments, the vacuum jacket 30 is made of polyimide film, preferably that sold under the tradename Kapton HN by DuPont. Kapton HN is an all polyimide film that can be, and in the present application preferably is, supplied adhesive-coated. The polyimide film has a thickness of at least 0.003 inch, preferably at least 0.004 inch, and most preferably of or about 0.005 inch. Thicknesses greater than 0.005 inch are also possible, but a thickness of 0.003 to 0.005 inch is preferred. The thicker the polyimide film, the lower its gas permeability and the better it is able to sustain a vacuum for longer periods of time without a vacuum source to continuously or periodically draw down the interior pressure of the vacuum jacket 30. The thinner the polyimide film, the more flexible the vacuum jacket 30 will be. While thicker films exhibit greater resistance to gas penetration and are better able to sustain a vacuum, thicker films also can be more difficult to handle during manufacturing. In addition, the less flexible, thick films also may resist collapsing against the outer surface of insulation 20 upon drawing a vacuum within the jacket 30. This is due to the relative rigidity of the thicker films, e.g., greater than 0.005 inch, compared to the thinner films, e.g. about or less than 0.005 inch. Complete collapse of the vacuum jacket 30 against the surface of the insulation 20 is desirable to ensure the maximum possible evacuation of the interior volume (lowest internal gas pressure). It also serves as a visual indicator of the effectiveness and persistence of the vacuum within the jacket 30. An expanded jacket 30 at any point during operation could be an indicator of either a vacuum failure, gas diffusing into the vacuum jacket 30 from the environment, or a leak of cryogenic material from the vessel 10 into the jacket 30. It has been found that a polyimide film thickness of or about 0.005 inch for the vacuum jacket 30 draws an appropriate balance between gas-impermeability and flexibility.

Figure 2:
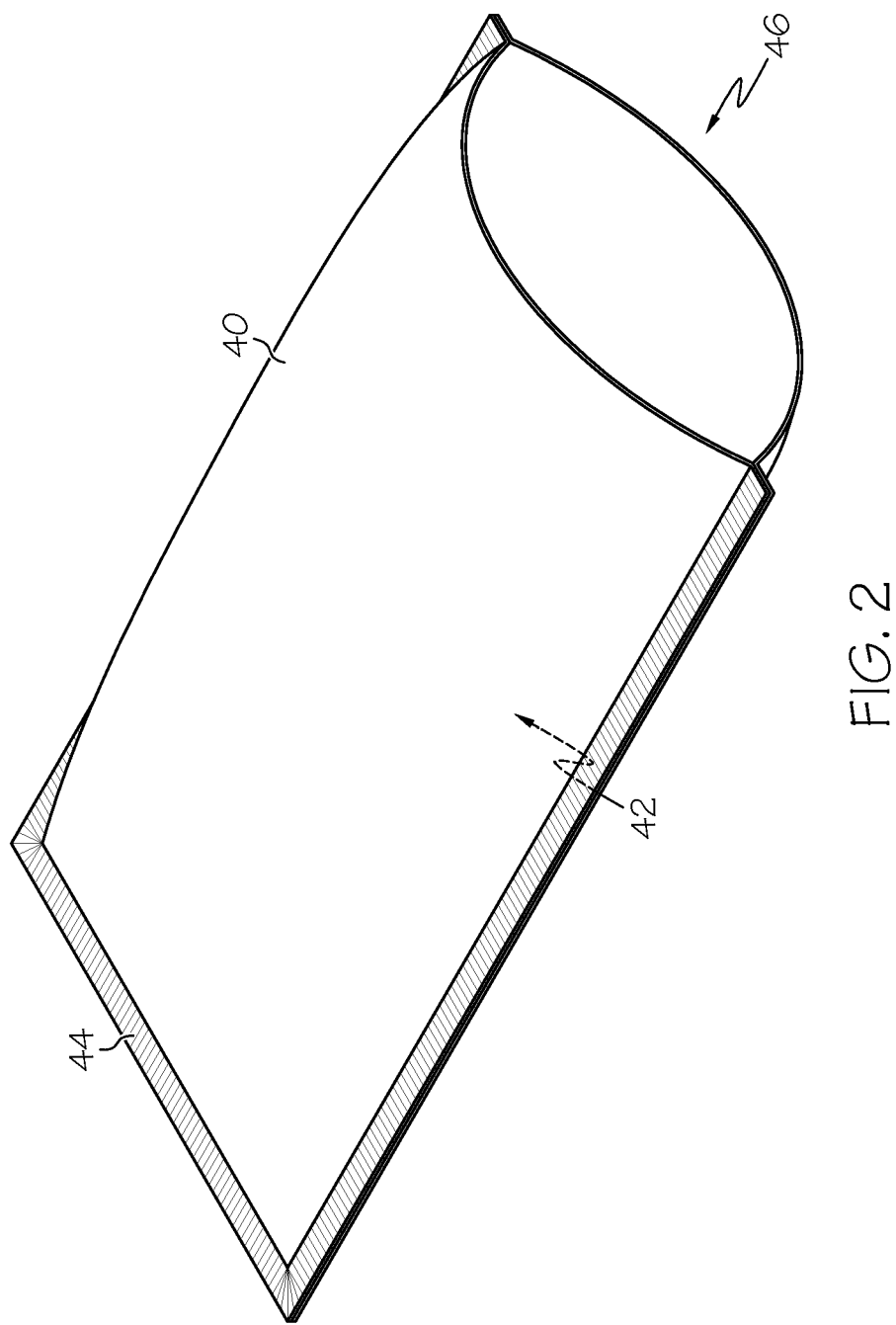
FIG. 2 is an isometric view of a pouch for forming a flexible vacuum jacket as herein described. The pouch is sealed to form the vacuum jacket once a storage vessel has been inserted therein.

One method to manufacture the vacuum jacket 30 is to form a bag or pouch made of two opposed sheets of polyimide (or other) film. In an exemplary method, two opposed sheets of polyimide film having the same dimensions are placed in register with and sealed to one another substantially around their perimeter, except for an opening where the insulation-encapsulated storage vessel 10 can be inserted. For example, as shown in FIG. 2, two rectangular sheets 40,42 of polyimide film can be provided, and joined or affixed to one another to form a seal 44 substantially about the perimeter thereof along three of their four edges to provide a pouch having an opening 46. In this embodiment, the polyimide film layers preferably are adhesive-coated polyimide, such as Kapton FIN from DuPont. The adhesive is heat-activated, and the two film sheets 42,44 can be bonded as described above and shown in FIG. 2 by contacting and compressing them between heated platens (not shown) to activate the adhesive and bond the sheets 42,44 along the three desired perimeter edges. Once this pouch is formed, the storage vessel 10 having insulation 20 wrapped or coated thereon is inserted into the pouch through the opening 46. The film sheets 42,44 are dimensioned so that the opening 46 as well as the volume within the pouch are large enough to accommodate insertion of the insulation-encapsulated vessel (both vessel 10 and insulation 20) therein. Any piping or instrumentation to feed into or out of the vessel, as well as a vacuum port for evacuating the vacuum jacket 30, can be accommodated through holes punched or otherwise formed in the polyimide film. These holes can be sealed around the penetrating structure (piping or instrumentation) using appropriate sealants, for example silicones. Alternatively and more preferably, the penetrating structure can be accommodated through pressure-tight fittings provided in the wall of the polyimide film. A preferred embodiment of such a fitting is described in more detail below.

Once the insulation-encapsulated vessel has been inserted within the pouch, the opening 46 thereof is sealed along the fourth edge of the opposed polyimide sheets in a similar manner as described above. This forms the flexible vacuum jacket 30 as an enclosure surrounding the storage vessel 10 and its insulation 20. Although the foregoing description of forming the vacuum jacket 30 was given based on using polyimide, it will be appreciated that a similar procedure could be used regardless of the material used for the vacuum jacket 30.

The flexible vacuum jacket 30 described above provides advantages compared to conventional steel vacuum vessels, in terms of cost, volume and weight savings. In addition to having a lower replacement cost, and to the ease of replacement compared to a steel vessel, the plastic film will be substantially lighter than a steel vessel. Furthermore, because it collapses against the outer surface of the insulation 20 during use, the flexible vacuum jacket 30 will occupy substantially less volume than the conventional steel vacuum vessel. These are significant advantages in airborne applications, where both weight and space are at a premium.

As will be appreciated, a well-insulated storage vessel 10 still may be susceptible to substantial heat leak through piping and instrumentation that must penetrate the insulation 20 surrounding the vessel, to provide access to and information regarding the vessel 10 contents. For example, a conventional storage vessel will require at least two different access lines, namely a fluid line and a vent line. The fluid line can be used both to fill the storage vessel with liquid cryogen, and to withdrawn that material for use as needed. The vent line is used to vent cryogen overpressure from the ullage above the liquid surface within the storage vessel 10, as known in the art. Each of these typically represents a separate penetration through the insulation 20, as well as through the conventional vacuum vessel that is typically employed. As a result, each of these lines provides a separate conductive pathway for heat leak into the storage vessel, thus increasing the cooling duty required to maintain sufficient refrigeration and diminishing the effectiveness of the insulation. Apart from providing conductive pathways themselves, the breaks in the insulation necessary to accommodate these lines provide additional pathways for thermal energy to enter the storage vessel. In addition to penetrating the insulation, the fluid- and vent-lines noted above also must penetrate the conventional vacuum vessel. Each such penetration introduces a potential failure mode for that vacuum vessel. Separately, at least one vacuum line that penetrates the conventional vacuum vessel but not necessary the insulation also typically is necessary to draw a vacuum on the vacuum vessel itself.

Figure 4:
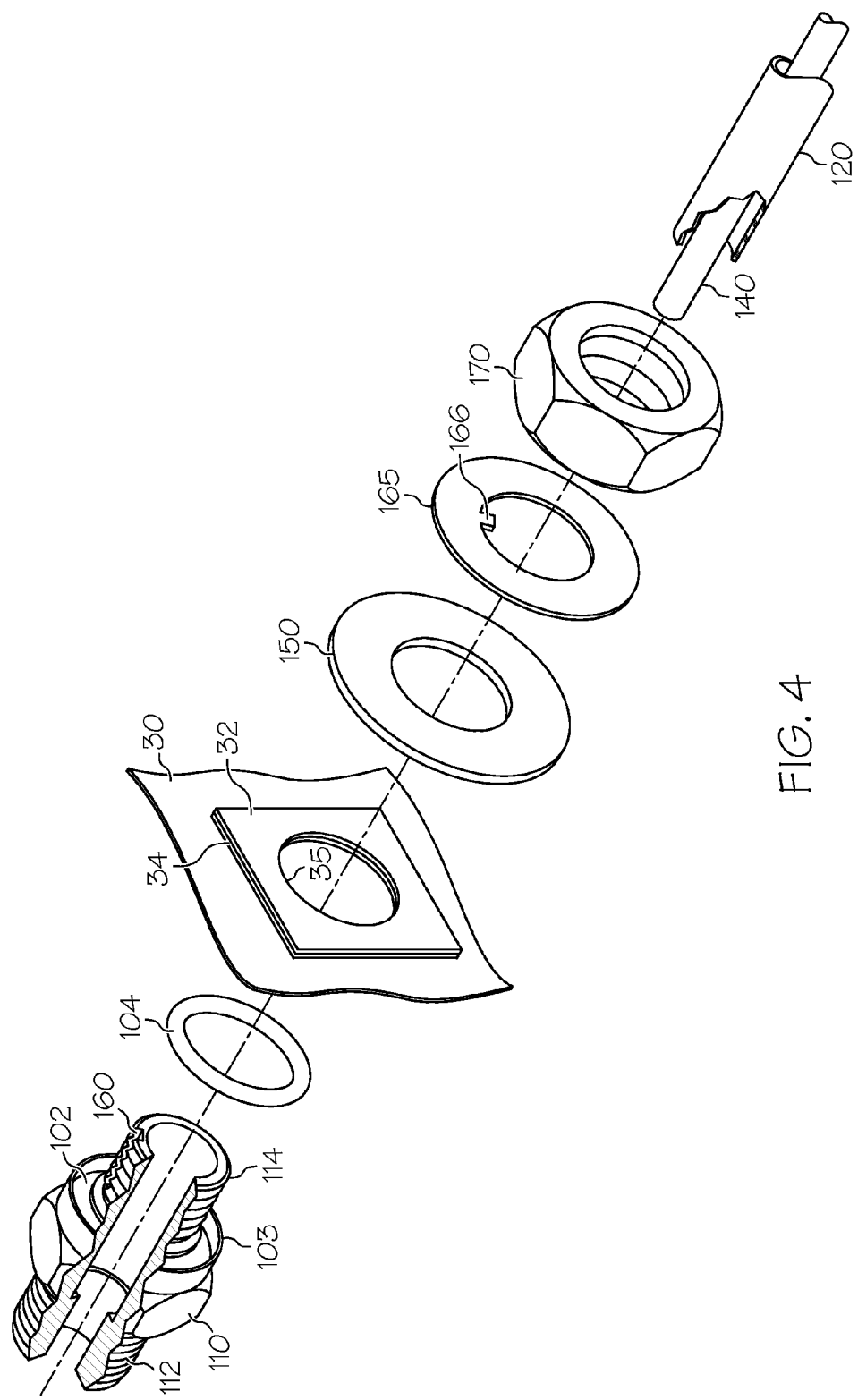
FIG. 4 is a centerline exploded view, partially broken away, of the fitting body shown in the fitting assembly of FIGS. 3a-b.

Referring now to FIGS. 3a-b and 4, in a preferred embodiment the fluid-, vent- and vacuum-passageways are all combined into a single fitting 100 that requires only a single penetration through the flexible vacuum jacket 30 disclosed herein, the insulation 20 and the storage vessel 10. In other words, the fluid- and vent-passageways pass through a single common opening in each of the vacuum jacket 30, insulation 20 and storage vessel 10, and the vacuum passageway is in fluid communication with the same opening in the vacuum jacket 30 through which the other two mentioned passageways pass. In this manner, the vacuum passageway is in fluid communication with the interior volume of the vacuum jacket 30. In a preferred embodiment, all three of the aforementioned passageways pass through a common fitting 100, which is fitted in and sealed to a single opening in the vacuum jacket 30 as will now be described.

In the illustrated embodiment, the fitting 100 includes a fitting body 110 having first and second threaded male ends 112 and 114, with a bore 116 extending therethrough. This fitting body provides a single conduit through the flexible vacuum jacket 30 to accommodate all three of the aforementioned passageways, which are isolated from one another. First, the fitting body's installation and securement to the vacuum jacket 30 to provide a fluid-tight seal therewith will be described. Thereafter, its structure for accommodating the three aforementioned passageways will be described.

First, an opening 35 (preferably circular) is cut into the vacuum jacket 30 to accommodate the second male end 114 of the fitting body therethrough. In one embodiment, the portion of the vacuum jacket 30 through which the opening 35 is to be provided can be first reinforced by securing thereto on one side or on opposite sides thereof first (and optionally second) reinforcing film(s) 32 (and 34). The reinforcing film(s) 32 (and 34) can be made of the same material as the vacuum jacket 30, e.g. polyimide film, and can be adhered thereto via conventional means. For example, adhesive-coated polyimide reinforcing films can be adhered to either side of the vacuum jacket 30 film via compression between heated platens to activate the adhesive coating. Once the reinforcing film(s) 32 (and 34) is/are in place, a hole can be cut through the resulting three-layer laminate to provide the opening 35 therethrough.

Next, the second male end 114 of the fitting body 110 is inserted through the opening 35 in the vacuum jacket 30. The second male end 114 extends axially from a seating face 103 of the fitting body 110. An annular groove 102 preferably is provided in the seating face 103, surrounding the base of the male end 114. The groove 102 has a depth sufficient to accommodate a resilient sealing ring 104. The sealing ring 104 preferably has a circular cross-section, with a diameter greater than the depth of the groove 102 such that when installed therein, the sealing ring 104 protrudes a distance from groove 102 above the seating face 103. Preferably, the sealing ring 104 diameter is such that it protrudes 0.5-3 mm, preferably, 0.8-2 mm, preferably about 1 mm, above the seating face 103. The sealing ring is made of a resilient material, such as polytetrafluoroethylene (PTFE), such as Teflon™ available from DuPont. Alternatively, other resilient materials also may be used, for example Buna N rubber as well as other synthetic or natural rubbers. When the storage vessel 10 will store cryogenic materials, it is preferred that the fluoropolymers such as PTFE are preferred for the sealing ring 104 compared to other rubbers, because the fluoropolymers will better withstand cryogenic temperatures while still maintaining their sealing properties at such temperatures.

To install the fitting body 110, the second male end 114 thereof is inserted through the opening 35 in the vacuum jacket 30 film as mentioned above, until that film (or a reinforcing layer 32/34 if present) reaches and abuts against the seating face 103, or preferably against a sealing ring 104 protruding above the seating face 103 from groove 102. Thereafter, a resilient O-ring gasket 150 having a center opening dimensioned to accommodate the second male end 114 of the fitting body 110 is fitted thereover and pressed up against the vacuum jacket 30 opposite the seating face 103. The O-ring gasket 150 preferably is made from a fluoropolymer, most preferably PTFE having embedded glass microspheres sold under the tradenam Blue Gylon™ and available from Garlock Sealing Technologies. Less preferably, other fluoropolymers and other natural or synthetic rubbers may be used. As noted above, the fluoropolymers are preferred when the storage vessel 10 will be used to store cryogenic materials. Good sealing of the vacuum jacket 30 between the sealing ring 104 and O-ring gasket 150 has been achieved using PTFE for the sealing ring 104 and Blue Gylon™ for the O-ring gasket 150. As can be seen, the resulting structure is a sandwich of the vacuum jacket 30 (and reinforcing films 32,34 if present) between the seating face 103 (or resilient sealing ring 104) and gasket 150, with the second male end 114 of the fitting body 110 extending therethrough.

A washer 165 is next fitted over the threaded male end 114 such that it abuts against the gasket 150 opposite the vacuum jacket 30. The washer 165 opening diameter is dimensioned to accommodate the threaded male end 114. The threaded male end 114 has an axial groove 160 machined therein, extending substantially the entire length of the threaded male end 114, up to the seating face 103. A projection or tooth 166 extends radially inward from the wall of the washer 165 opening. The axial groove 160 in the threaded male end 114 is dimensioned to accommodate and receive the radial projection 166 as the washer 165 is translated over the male end 114 of the fitting body 110. After the washer 165 is abutted against the gasket 150 over the threaded male end 114, a nut 170 having complementary threads to those on the male end 114 is used to tighten the washer 165 against the gasket 150. Preferably the nut 170 is tightened to 20-30 ft-lb of torque, more preferably 22-26 ft-lb, most preferably about 24 ft-lb. The radial projection 166 on the washer 165 and the axial groove 160 in the threaded male end 114 cooperate to inhibit or prevent rotation of the washer 165 as it is tightened against the gasket 150 by the nut 170. Accordingly, the gasket 150 experiences no torsional force as a result of tightening by the nut 170. Consequently, so long as the fitting body 110 is prevented from rotating while the nut 170 is tightened, the flexible vacuum jacket 30 likewise experiences no torsional force as it is compressed between the seating face 103 (preferably sealing ring 104) and the gasket 150. As a result, twisting the vacuum jacket 30 film (which may damage or tear the film) in the vicinity where the fitting body 110 penetrates it is inhibited or prevented. In the preferred embodiment (described below), the fitting body 110 is rigidly connected to the cryogenic-storage vessel 10 via a vent tube 120 prior to fitting it to the vacuum jacket 30 as described in this paragraph. Accordingly, while the nut 170 is tightened to compress and seal the vacuum jacket between the sealing ring 104 and the gasket 150, the fitting body will be prevented from rotating.

The fitting body has a bore 116 having a first inner diameter 117 substantially extending through the first male end 112, and a second inner diameter 118 larger than the first inner diameter 117 substantially extending through the second male end 114. A vent tube 120 extends from the cryogenic-storage vessel 10 and into the fitting body through the second male end 114. The first inner diameter 117 of the bore 116 is dimensioned to accommodate the outer diameter of the vent tube 120. The second inner diameter 118 of the bore 116 is dimensioned so that it is larger than the outer diameter of the vent tube 120, such that the vent tube 120 and the second inner diameter define an annular vacuum space 119 therebetween when the vent tube 120 extends through the bore 116 of the fitting body 110. As best seen in FIG. 3a, the vacuum space 119 is in fluid communication with the interior volume of the flexible vacuum jacket 30, about the outer surface of the vent tube 120. A radial vacuum port 130 is drilled or otherwise provided through the fitting body 110 at an axial position such that the port 130 is in fluid communication with the annular vacuum space 119. A vacuum tube 132 is welded to the fitting body 110 in fluid communication with the vacuum port 130. A vacuum fitting 134 on the vacuum tube 132 can be used to connect to a vacuum or suction source to draw a vacuum on the interior volume of the flexible vacuum jacket 30 via a vacuum passageway that extends therefrom through the annular vacuum space 119, the vacuum port 130 and vacuum tube 132.

The vent tube is in fluid communication with the ullage (vapor) space inside the storage vessel 10, and is sealed to the wall thereof to provide a fluid-tight seal under cryogenic conditions. For example, the vent tube 120 can extend through an opening in the storage-vessel wall, and be welded thereto around its outer diameter where it penetrates the storage vessel 10. Alternatively, though less preferably, the fitting tube 120 can be secured to and passed through the storage-vessel wall via fittings (not shown). Fittings are less preferred in this case because during use the fittings will be inaccessible; i.e. they will be located beneath the insulation 20 and subject to cryogenic temperatures, and therefore could not be readily serviced if a failure were to occur. Regardless how it is secured, the vent tube 120 is rigidly connected to the storage vessel 10 once installed. As seen in FIG. 3a, the vent tube 120 extends a distance into the storage vessel vapor space in one direction, and a distance out from the storage vessel 10, through the insulation 20 surrounding that vessel 10 in the opposite direction. The openings through the insulation 20 and storage vessel 10 to accommodate penetration of the vent tube 120 can be provided via conventional means. Preferably, those openings are closely toleranced to the outer diameter of the vent tube 120.

After the fitting body 110 is fitted and sealed to the vacuum jacket 30 so that its bore 116 passes through the jacket 30, the portion of the vent tube 120 extending out from the storage vessel 10 (through insulation 20) is inserted into and through the fitting body 110 via the second male end 114 as mentioned above, so that it emerges and extends from the first male end 112. Initially, the tube 120 is free to translate axially through the bore 116 of the fitting body 110. Once the fitting body 110 is properly positioned over the vent tube 120 for its in-service location, preferably close to or embedded within the insulation 20 over the storage vessel 10, the male end 112 of the fitting body 110 is compressively sealed over the vent tube 120. Such compressive seal is achieved, for example, via a conventional nut-and-ferrule fitting, wherein ferrules are fitted over the outer diameter of the vent tube 120 and positioned within a nut 123, which is screwed over the threaded male end 112 and tightened to form a compression seal over the vent tube 120. Conventional Swagelok fittings can be used for this purpose. As will be appreciated from FIG. 3a, forming a seal between the vent tube 120 and the fitting body 110 in this manner seals the vacuum passageway in communication with the interior volume of the vacuum jacket, which in the illustrated embodiment consists of the vacuum space 119, the vacuum port 130 and the vacuum tube 132. In FIG. 3a, the fitting body 110 is illustrated received or embedded partially within the insulation 20. Embedding the fitting body 110 or a portion thereof within the insulation 20 is advantageous from the standpoint of preventing contact between sharp edges of that body 110 and the vacuum jacket 30 when it is drawn against the insulation under vacuum.

As seen in FIG. 3a, a portion of the vent tube extends from the first male end 112 of the fitting body, through the nut 123 used to form the compressive seal between the fitting body 110 and the vent tube 120. A T-fitting 122 is fitted to the terminus of the portion of the vent tube 120 that extends from male end 112 of the fitting body (through nut 123), such that the T-fitting is provided in fluid communication with the vent tube 120. The T-fitting 122 can be connected to the terminus of the vent tube 120 via conventional means, e.g. via a compressive fitting similar to that described above (and illustrated in FIG. 3a), less preferably via welding or other conventional means. One branch of the T-fitting, preferably the lateral branch 122a relative to the longitudinal axis of the bore 116, leads to a vent. In this manner, cryogenic-gas overpressure from within the ullage space of the storage vessel 10 can be vented via the vent line 120, through the T-fitting 122 and out through the lateral branch 122a to the vent. The other branch 122b of the T-fitting 122, preferably coaxial with the bore 116, accommodates a fill tube 140 therethrough. The fill tube 140 can be inserted into the T-fitting 122 via conventional means. For example, the fill tube 140 can be inserted through an opening in and endcap on the T-fitting 122, and then a weld applied to seal the opening around the fill-tube outer wall. Alternatively, the coaxial branch 122b of the T-fitting 122 through which the fill tube 140 is inserted can be threaded, with the fill tube 140 being inserted therethrough and sealed therewith via a conventional compressive (nut-and-ferrule) fitting. The fill tube 140 extends (preferably concentrically) through the co-axial branches of the T-fitting 120 and the vent tube 120 (through fitting body 110), and emerges inside the storage vessel 10. The fill tube 140 can terminate a short distance beyond the terminus of the vent tube 120 inside the vessel 10 as shown. Alternatively, the fill tube 140 can bend 90° or some other angle and extend to a terminus that will be submerged beneath the surface of the cryogenic liquid 18 inside the storage vessel 10 during use (not shown).

The cryogenic material can be withdrawn either in the cryogenic-liquid phase or in the gas phase depending on the location of the fill-tube terminus within the vessel. In the embodiment illustrated in FIG. 1, the fill-tube terminus 142 is located in the ullage space above the liquid-phase cryogen 18. So in the illustrated embodiment the fill tube 140 will withdraw the cryogenic material in the gas phase. In an alternative design the fill-tube terminus 142 could be submerged beneath the surface of the liquid-phase cryogen 18. In this alternative embodiment, the fill tube would have access to and withdraw cryogenic material in the liquid phase. Where to place the fill-tube terminus 142 to withdraw either liquid- or gas-phase cryogen will depend on the demands of the particular application, and is not critical here.

Accordingly, three fluid passageways are combined to pass through a single fitting 100 that requires only a single penetration through the vacuum jacket 30 and a single penetration through the insulation 20 and cryogenic-storage vessel 10 within. In addition, using the structure described above, tightening the fitting 100 to provide a vacuum-tight seal with the flexible vacuum jacket 30 does not produce torsional forces that could damage or tear the jacket film. This permits use of relatively flexible films for the vacuum jacket, such as the 0.003 or 0.005-inch thick polyimide materials mentioned above.

According to one method of assembly, the storage vessel 10 is first fitted with the vent tube 120 as described above. Then the storage vessel 10 is wrapped in the desired insulation 20, which can be selected based on the demands of the particular application. Separately, the pouch illustrated in FIG. 2 for making the vacuum jacket 30 is made by sealing two sheets of polyimide or other flexible film about their perimeter, leaving an opening 46 through which to insert the storage vessel 10. Preferably the opening 35 is placed through one of the sheets of the film at or adjacent the sealed end of the pouch opposite the opening 46, with or without reinforcing sheets 32,34. Thereafter, the fitting 100 is installed and sealed to the film of the pouch at the opening 35. The insulation-wrapped storage vessel having the vent tube 120 extending therefrom is then inserted into the pouch such that the protruding vent tube 120 is inserted into the fitting body 110 now sealed to the polyimide (or other) film through the second male end 114 so that it extends out the first male end 112 thereof. Then, the opening 46 of the pouch is sealed to provide the vacuum jacket 30 as an enclosure around the insulation-encapuslated storage vessel 10. Finally, the fitting body 110 is secured over the vent tube 120 (e.g. via a compressive fitting) and the T-fitting 122 and fill tube 140 are installed as above described. It should be noted that the storage system is not limited to the particular method of assembly described here. Alternative methodologies could be used. For example, instead of a pouch, the vacuum jacket could be formed initially from two dome-shaped layers that are joined at a circumferential seam to form a 'pill'-configured vacuum jacket, wherein each dome-shaped layer is provided in three dimensions to more closely approximate the contour of a cylindrical storage vessel 10. This alternative construction would be expected to result in the vacuum jacket folding over itself to a lesser degree on collapsing against the insulation-encapuslated storage vessel under vacuum. This is because the initial shape of the vacuum jacket could be selected to more closely follow the contour of the storage-vessel surface (and therefore have less collapsing to do on being evacuated).

In use, the storage vessel 10 and its insulation 20 are disposed within the vacuum jacket 30 as described above. The vacuum jacket 30 is sealed and a vacuum is drawn therein, which causes the flexible vacuum jacket to collapse against and to substantially follow the contour of the insulation 20 surrounding the storage vessel 10. Preferably, the vacuum jacket 30 is evacuated via the vacuum passageway described above (via vacuum space 119, vacuum port 130 and vacuum tube 132) to a gas pressure of not more than 0.5 torr, more preferably not more than 0.2 torr, more preferably not more than $10^{-2}$ torr, $5 \times 10^{-2}$ torr or $10^{-3}$ torr. Optionally, substantially higher vacuums can also be used, for example pressures not more than $10^{-4}$ torr or $10^{-5}$ torr. Such higher vacuums are desirable when conventional MLI insulation is used, wherein the lower vacuums ($10^{-2}$ to 0.2 torr) may be permissible when aerogel spacer layers are used due to their reduced sensitivity to vacuum to achieve good thermal insulation performance. Once the desired vacuum has been drawn within the vacuum jacket 30, a cryogenic liquid 18 can be introduced into the storage vessel 10 via the fill tube 140. Cryogenic material can then be delivered as needed, also through the fill tube 140 in a conventional manner. Cryogenic gas overpressure in the ullage space within the storage vessel 10 can be vented via the vent tube 120 and lateral branch 122a of the T-fitting 122 as described above.

The following example illustrates additional features, and is provided by way of illustration only, and not limitation.

EXAMPLE

A cylindrical storage vessel having a nominal diameter of 9 inches and a nominal length of 15 inches was wrapped in insulation. The insulation consisted of five layers of silica aerogel (5 mm thickness) intermediate alternating layers of metalized-polyimide film conventional for MLI insulation. The insulation-wrapped storage vessel was enclosed within a flexible polyimide vacuum jacket having a thickness of 5 mils. A vacuum was drawn on the vacuum jacket to a vacuum of less than 140 microns Hg. The polyimide vacuum jacket had only a single penetration through which vacuum-, fluid- and vent-passageways were accommodated in a single fitting as described above. Next the storage vessel was filled with liquid nitrogen and the thermal performance of the insulation-plus-vacuum jacket was measured. Over a period of two days, the average rate of heat leak was determined to be 17.1 watts over a surface area of 0.5 m² (the nominal surface area of the storage vessel), which equates to a heat flux of 34.2 W/m². The vacuum jacket continued to hold a micron-order vacuum at ambient temperature over several months after the conclusion of the liquid-nitrogen test.

Although the hereinabove described embodiments constitute preferred embodiments of the invention, it is to be understood that various modifications or changes can be made thereto without departing from the spirit and the scope of the invention as set forth in the appended claims.

What is claimed is:

1. A storage system comprising a storage vessel, thermal insulation disposed outside said storage vessel, a flexible vacuum jacket substantially enclosing said storage vessel and said thermal insulation and defining a vacuum space between said jacket and said vessel, and a fitting fitted in an opening in said vacuum jacket, said fitting accommodating a fluid passageway for delivering a fluid to and/or from said storage vessel, a vent passageway for venting overpressure from said storage vessel, and a vacuum passageway in fluid communication with said vacuum space, wherein each of said passageways passes through said fitting.

2. The storage system of claim 1, said flexible vacuum jacket comprising a flexible plastic film that is collapsible against said insulation upon drawing a vacuum in said vacuum space.

3. The storage system of claim 2, said flexible plastic film comprising polyimide film.

4. The storage system of claim 3, said polyimide film having a thickness of 0.003 to 0.005 inch.

5. The storage system of claim 3, said polyimide film having a thickness of about 0.005 inch.

6. The storage system of claim 2, said flexible plastic film being effective to withstand repeated cycles of cooling to a cryogenic temperature less than 200K and reheating to a temperature of 298K without cracking.

7. The storage system of claim 2, said flexible plastic film being flexible at a cryogenic temperature less than 200K.

8. The storage system of claim 2, said flexible plastic film being flexible at a cryogenic temperature less than 100K.

9. The storage system of claim 1, said vacuum jacket being substantially collapsed against said insulation under the influence of a vacuum drawn within said vacuum space.

10. The storage system of claim 9, wherein a gas pressure within said vacuum space is not more than 0.2 torr.

11. The storage system of claim 1, said thermal insulation substantially enclosing said storage vessel.

12. The storage system of claim 1, said insulation comprising a plurality of alternating metalized plastic film layers and intermediate spacer layers, said spacer layers having a thermal conductivity of or less than 0.3 W/m-K.

13. The storage system of claim 1, said insulation comprising a plurality of alternating thermally-reflective layers and intermediate aerogel layers.

14. The storage system of claim 13, said intermediate aerogel layers comprising silica aerogel and having a thermal conductivity on the order of 0.01 W/m-K.

15. The storage system of claim 1, said fitting comprising a fitting body having a bore extending therethrough and a male end that extends axially from a seating face of the fitting body, said male end having an axial groove therein, an O-ring gasket fitted over said male end, and a washer having a radial projection also fitted over said male end such that said radial projection is received in said axial groove, said male end extending through said opening in the vacuum jacket with a portion of the vacuum jacket surrounding said opening being sealed in between said seating face and said O-ring gasket via a tightening force applied against said O-ring gasket by said washer, wherein the radial projection of said washer extending in said axial groove inhibits rotation of said washer during tightening.

16. The storage system of claim 15, said seating face having an annular groove therein, a sealing ring being disposed in said annular groove and partially protruding therefrom above said seating face, said portion of the vacuum jacket being sealed between said sealing ring and said O-ring gasket.

17. The storage system of claim 15, said bore through the fitting body having an inner diameter extending at least through said male end, the system further comprising a vent tube defining said vent passageway and extending into the fitting body through said male end, said vent tube having an outer diameter smaller than the inner diameter of said bore such that the vent tube and said inner diameter define a vacuum space for said vacuum passageway therebetween, a vacuum port provided through the fitting body and in fluid communication with said vacuum space, and a fill tube defining said fluid passageway extending through said vent tube within said fitting body.

18. The storage system of claim 15, said fitting body being at least partially embedded in said insulation.

19. The storage system of claim 15, further comprising a reinforcing film secured to said portion of said vacuum jacket surrounding the opening therein.

20. The storage system of claim 17, said fitting body having another male end opposite the aforementioned male end, said vent tube extending from said aforementioned male end, through the fitting body and emerging from said other male end thereof.

21. A fitting comprising a fitting body having a bore extending therethrough and a male end that extends axially from a seating face of the fitting body, said male end having an axial groove therein, an O-ring gasket fitted over said male end, a washer having a radial projection also fitted over said male end such that said radial projection is received in said axial groove thereby inhibiting rotation of said washer over said male end, said bore through the fitting body having an inner diameter extending at least through said male end, a vent tube extending into the fitting body through said male end, said vent tube having an outer diameter smaller than said inner diameter of said bore such that the vent tube and said inner diameter define an annular vacuum space therebetween, a vacuum port provided through the fitting body and in fluid communication with said annular vacuum space, and a fill tube extending through said vent tube within said fitting body.

22. The fitting of claim 21, said seating face having an annular groove therein, a sealing ring being disposed in said annular groove and partially protruding therefrom above said seating face.

23. The fitting of claim 22, further comprising a flexible film having an opening therein fitted over said male end such that the male end of the fitting extends through said opening, said flexible film being sealed between said sealing ring and said O-ring gasket.

* * * * *

UNITED STATES PATENT AND TRADEMARK OFFICE
CERTIFICATE OF CORRECTION

PATENT NO. : 8,807,382 B1
APPLICATION NO. : 12/752543
DATED : August 19, 2014
INVENTOR(S) : Mark S. Haberbusch et al.

It is certified that error appears in the above-identified patent and that said Letters Patent is hereby corrected as shown below:

In the Specification,

At column 4, line 31, please add ® after the word "Dacron".

At column 6, line 26, please replace FIN with HN.

Signed and Sealed this
Twenty-third Day of December, 2014

Michelle K. Lee
*Deputy Director of the United States Patent and Trademark Office*